UNITED STATES PATENT OFFICE.

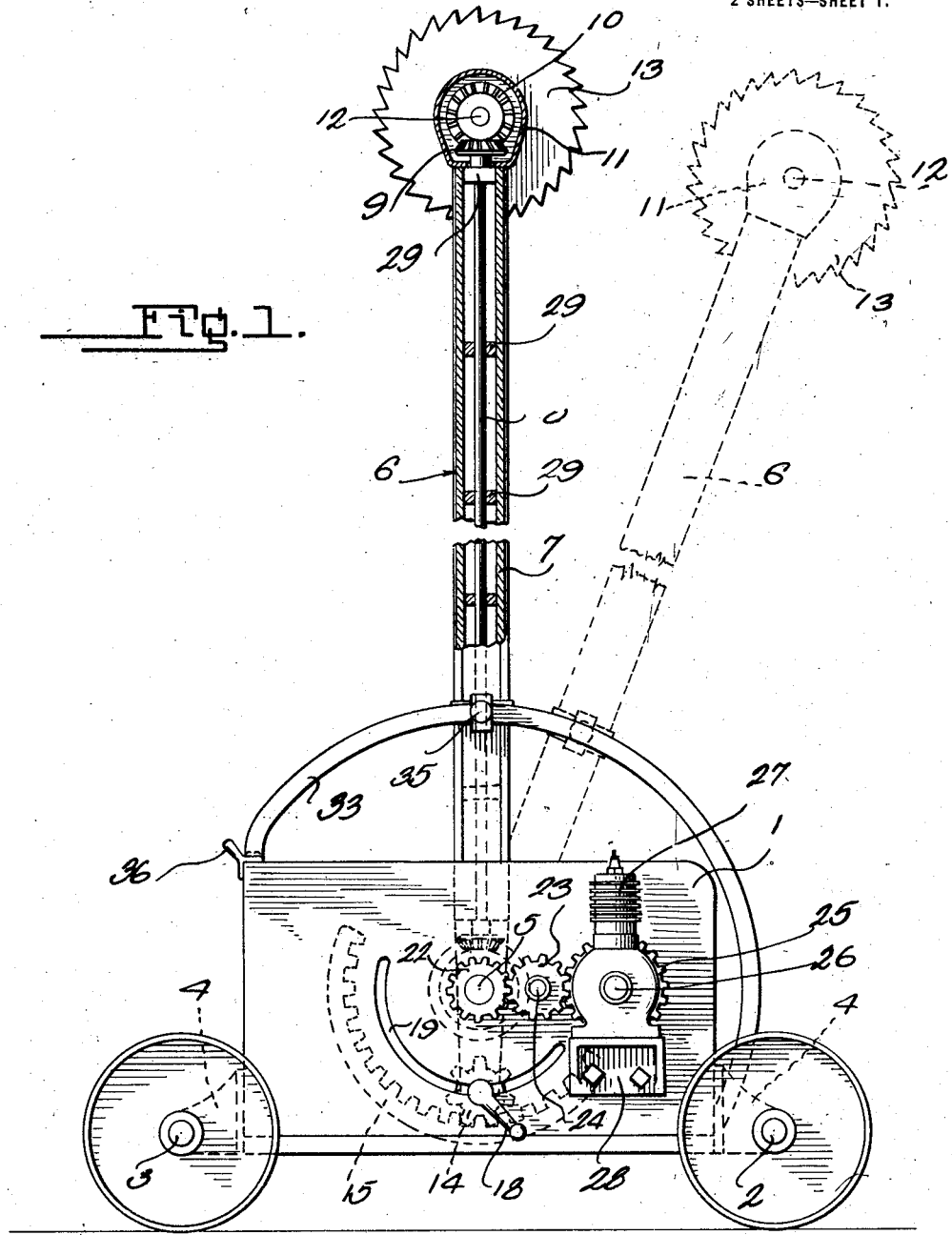

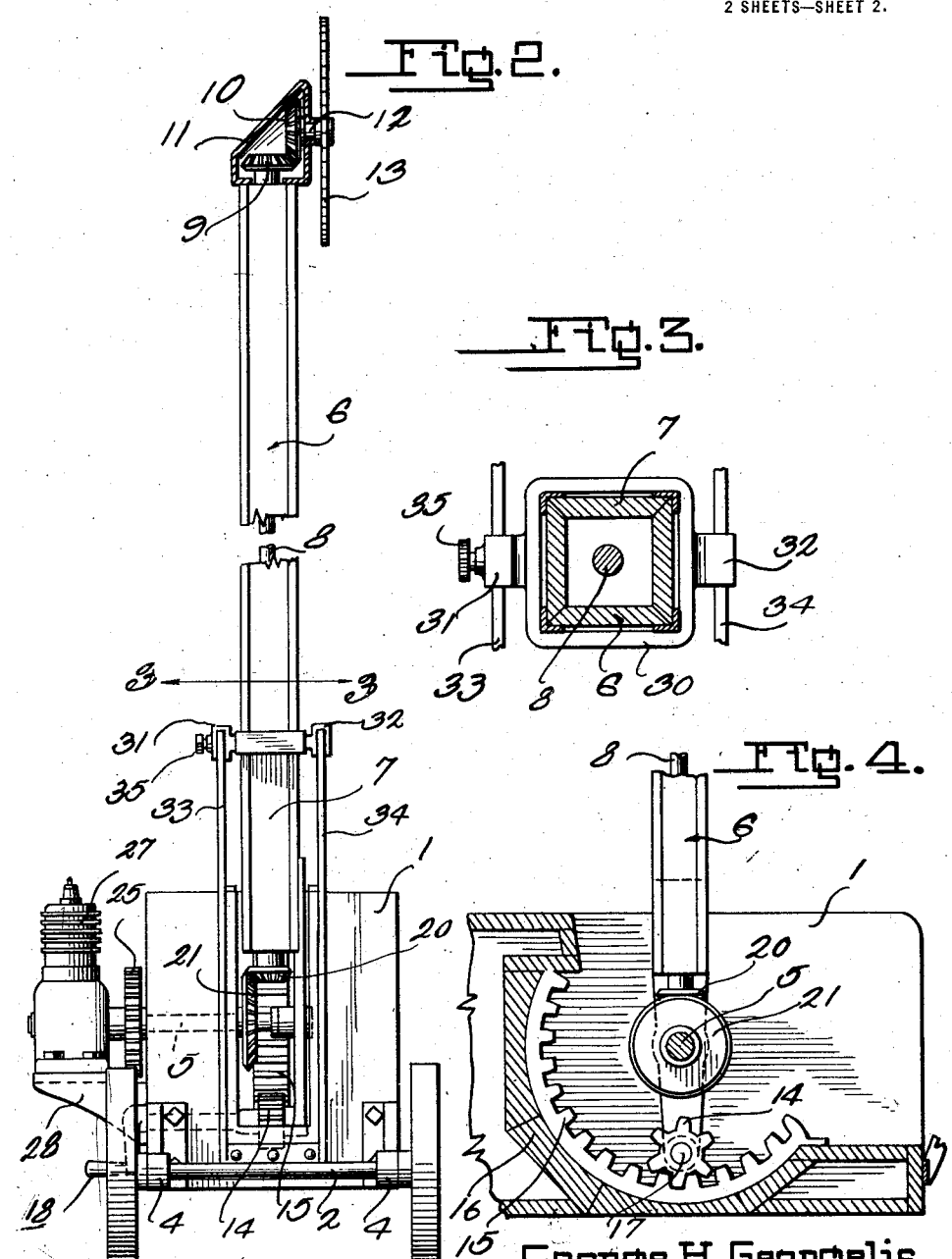

GEORGE H. GEORGELIS, OF MOULTRIEVILLE, SOUTH CAROLINA.

TREE-PRUNING MACHINE.

1,364,432. Specification of Letters Patent. Patented Jan. 4, 1921.

Application filed December 12, 1918. Serial No. 266,506.

*To all whom it may concern:*

Be it known that I, GEORGE H. GEORGELIS, a citizen of the United States, and a resident of Moultrieville, in the county of Charleston and State of South Carolina, have invented certain new and useful Improvements in Tree-Pruning Machines, of which the following is a specification.

This invention relates to a portable machine for pruning or trimming trees, and an object of the invention is to provide a pruning device comprising a portable supporting structure carrying a standard, upon the upper edge of which is mounted a circular saw and to provide a prime mover carried by the portable supporting structure for rotating the said saw to trim or prune trees.

Another object of the invention is to provide a tree trimming or pruning device as specified, which includes means for guiding the pivotal movement of the saw carrying standard, means for moving the saw carrying standard in an arc about its pivotal support upon the portable supporting structure, and means to maintain a continuous driving connection between the prime mover and the saw under various adjusted movements of the saw and its carrying standards.

Other objects of the invention will appear in the following detailed description taken in connection with the accompanying drawings, forming a part of this specification and in which drawings—

Figure 1 is a side elevation of the improved tree trimming machine showing parts thereof in section, Fig. 2 is an end elevation of the tree trimming machine.

Fig. 3 is a horizontal section on the line 3—3 of Fig. 2, and

Fig. 4 is a fragmentary vertical section through the tree pruning machine illustrating the means for adjusting the angle of the saw carrying standard.

Referring more particularly to the drawings, wherein like characters indicate like and corresponding parts throughout the several views, 1 indicates the supporting structure of the improved pruning machine which has front and rear axles 2 and 3 respectively supported by suitable bearings 4 attached to the ends of the supporting body 1. The shaft 5 extends transversely through the body 1 and it pivotally supports the standard structure 6. This standard structure 6 comprises a column which is hollow and preferably rectangular in shape.

A shaft 8 extends upwardly through the column 7 and has a beveled gear 9 upon its upper end which meshes with a second beveled gear 10. The beveled gears 9 and 10 are housed by a suitable housing 11 which rotatably supports the shaft 12 upon which the beveled gear 10 and the circular saw 13 are mounted. The circular saw 13 is of the usual type employed for sawing wood and is adapted to saw or cut limbs or branches from trees or the like in the process of pruning or trimming the trees.

The column 7 is pivotally mounted upon the shaft 5 and its lower end has a pinion 14 rotatably mounted therein which meshes with the teeth of a segmental rack 15. This segmental rack 15 is supported by suitable bracing structure 16 within the body 1. The shaft 17 upon which the pinion 14 is mounted has a crank handle 18 mounted thereon exteriorly of the body 1 and by manual rotation of this crank shaft, the standard 6 may be moved about the axis of the shaft 5 as an axis for gradually moving the saw across a limb or for adjusting the angle of the standard 6 to regulate the height of the saw 13. The side of the body 1 is provided with an arcuate slot 19 concentric of the rack 15 to permit movement of the shaft 17 therethrough.

The shaft 8 has a beveled pinion 20 mounted upon its lower end which meshes with a beveled gear 21 mounted upon the shaft 5 for rotation therewith. A gear 22 is mounted upon the shaft 5 and it meshes with a gear 23 rotatably supported by the stub shaft 24. The gear 23 in turn meshes with a gear 25 which is carried by the crank or operating shaft 26 of the prime mover 27. In the drawings, the prime mover 27 is illustrated as a single cylinder internal combustion engine, however, it is to be understood that any suitable type of prime mover may be employed for rotating the shaft 5 and consequently rotating the saw 13 through the medium of the shaft 8 and its meshing pairs of beveled gears.

The prime mover 27 is supported upon the supporting structure 1, by a suitable bracket 28.

Suitable bearings 29 are positioned at spaced intervals in the column 7 for rotatably supporting the shaft 8 and preventing vibration thereof.

A yoke 30 is attached to and mounted about the column 7 and it has a pair of guide members 31 and 32 carried by opposite sides thereof and positioned upon opposite sides of the column 7. The guide members 31 and 32 are provided with openings extending therethrough, through which the arcuate guiding rails 33 and 34 respectively engage. The rails 33 and 34 are carried by the supporting structure 1, being concentric of the axis of the shaft 5, and they, in connection with the guide members 31 and 32, guide and stabilize the pivotal movement of the upright 6. A thumb or set screw 35 is carried by the guide member 31 for holding the column or upright in adjusted position when desired, or for creating friction to retard to a certain extent the pivotal movement of the upright or column if it is so desired.

The supporting structure 1 may be propelled by any suitable power or may be manually pushed, for which purpose a handle 36 is provided which is attached to the rear upper corner of the supporting structure. The front end of the supporting structure 1 is provided with a recess or opening therein to permit the projection of the column or upright 7 therethrough when the latter is lowered.

In use, the tree pruning machine is manually pushed into proper position, and the prime mover 27 started, which will impart rotation to the saw 13 after which the crank handle 18 is rotated for rotating the pinion 14 to move the column or standard 6 about the shaft 5 as a pivot to gradually bring the saw into engagement with the limb to be cut from the tree, or to pass through the said limb and sever it from the tree body.

Changes in details may be made without departing from the spirit of this invention, and within the scope of the subjoined claims.

I claim:

1. In a tree pruning machine, the combination of a carriage, an upright standard pivotally supported by said carriage, a saw rotatably carried by the upper end of said standard, means for rotating said saw, a pair of arcuate side rails carried by said carriage, guiding socket members carried by said standard and engaging said rails for guiding pivotal movement of the standard, and a device for securing said socket members in an adjusted position with respect to said rails.

2. In a tree pruning machine, the combination of a carriage, an upright standard pivotally supported by said carriage, a saw rotatably carried by said standard, means for rotating said saw, a pair of arcuate side rails carried by said carriage, guiding socket members carried by said standard and engaging said rails for guiding pivotal movement of the standard, a segmental rack carried by said carriage, a pinion rotatably carried by the lower end of said standard, a crank handle connected to said pinion for rotating the pinion to move said standard about its pivotal support.

GEORGE H. GEORGELIS.